US009266405B1

(12) United States Patent
Blanchard

(10) Patent No.: US 9,266,405 B1
(45) Date of Patent: Feb. 23, 2016

(54) ROOF TOP AUTOMOBILE VENTILATION SYSTEM

(71) Applicant: Stephen R. Blanchard, Oxnard, CA (US)

(72) Inventor: Stephen R. Blanchard, Oxnard, CA (US)

( * ) Notice: Subject to any disclaimer, the term of this patent is extended or adjusted under 35 U.S.C. 154(b) by 418 days.

(21) Appl. No.: 13/787,392

(22) Filed: Mar. 6, 2013

Related U.S. Application Data

(63) Continuation-in-part of application No. 12/508,422, filed on Jul. 23, 2009, now abandoned.

(51) Int. Cl.
*B60H 1/26* (2006.01)
*B60H 1/00* (2006.01)

(52) U.S. Cl.
CPC .................................. *B60H 1/00457* (2013.01)

(58) Field of Classification Search
CPC .................................................... B60H 1/00457
USPC .......................................................... 454/136
See application file for complete search history.

(56) References Cited

U.S. PATENT DOCUMENTS 4,085,666 A 4/1978 Ternes
4,658,707 A * 4/1987 Hawkins ............ B60H 1/00457 454/140
4,688,845 A 8/1987 Kingsley
4,744,430 A 5/1988 McCoy
4,748,825 A 6/1988 King
4,804,140 A 2/1989 Cantrell
4,895,065 A * 1/1990 Lamparter ......... B60H 1/00457 454/136
D310,874 S 9/1990 Utley, Jr.
5,038,674 A 8/1991 Merges
5,078,047 A 1/1992 Wimberly
5,148,736 A 9/1992 Juang
5,167,563 A 12/1992 Kanno et al.
5,588,909 A 12/1996 Ferng
5,672,101 A 9/1997 Thomas
5,768,834 A * 6/1998 Pinder ...................... B60J 7/041 114/211
5,918,972 A 7/1999 Van Belle
6,290,593 B1 9/2001 Weissbrich et al.
6,328,369 B1 12/2001 Nagai
6,476,315 B2 11/2002 Ganz
6,692,130 B1 2/2004 Snow
6,808,450 B2 10/2004 Snow
6,840,660 B2 1/2005 Hymer
7,595,976 B2 9/2009 Kato et al.
7,693,630 B1 4/2010 Mitchell
7,872,443 B2 1/2011 Ward
8,122,981 B2 2/2012 Jang et al.
2003/0013405 A1 1/2003 Guilford, Sr.
2004/0089007 A1 5/2004 Umebayashi et al.
2004/0110459 A1 6/2004 Snow
2005/0003751 A1 1/2005 Thomas
2005/0194414 A1 9/2005 Lynch
2006/0080875 A1* 4/2006 Nelson .................... G09F 21/04 40/593
2007/0125417 A1 6/2007 Johanson et al.
2008/0026705 A1 1/2008 Asami
2009/0273902 A1 11/2009 Kato et al.

* cited by examiner

*Primary Examiner* — Alissa Tompkins
*Assistant Examiner* — Phillip E Decker

(57) ABSTRACT

A system for regulating the cabin temperature of an automobile features an automobile having a roof and a passenger cabin. The roof features a ventilation housing aperture located therein. The system features a ventilation housing having a hollow housing chamber located therein. A housing bottom side features a fan aperture located therein. The housing bottom side is located on the ventilation housing aperture thereon. A housing rear side features an exterior vent aperture located therein. The system features an anterior chamber and a posterior chamber located in the hollow chamber. A chamber divider is located between the anterior chamber and the posterior chamber. The system features a fan located in the fan aperture operatively connected to a power source.

14 Claims, 5 Drawing Sheets

ROOF TOP AUTOMOBILE VENTILATION SYSTEM

CROSS REFERENCE

This application claims priority to U.S. patent application Ser. No. 12/508,422 filed Jul. 23, 2009 the specification(s) of which is/are incorporated herein in their entirety by reference.

FIELD OF THE INVENTION

The present invention relates to ventilation systems for vehicles, or more specifically, roof based interior ventilation systems for automobiles.

BACKGROUND OF THE INVENTION

Automobiles have been in use since the late 1800s, but originally contained open seating for the driver and passengers. Through the early 1900s, automobile cabins emerged and advanced in design to better protect the occupant as well as provide a more comfortable environment. Automobile cabin temperatures tent to rise to extreme levels during the summer months in many areas, especially with all the windows closed. A need exists for a better ventilation system for automobile cabins. The present invention features a system for regulating the cabin temperature of an automobile.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a system for regulating the cabin temperature of an automobile. In some embodiments, the system comprises an automobile having a roof and a passenger cabin. In some embodiments, the roof comprises a ventilation housing aperture located therein. In some embodiments, the system comprises a ventilation housing. In some embodiments, the ventilation housing comprises a hollow housing chamber located therein. In some embodiments, a housing bottom side comprises a fan aperture located therein. In some embodiments, the housing bottom side is located on the ventilation housing aperture thereon. In some embodiments, a housing rear side comprises an exterior vent aperture located therein. In some embodiments, the system comprises an anterior chamber located in the hollow chamber. In some embodiments, the system comprises a posterior chamber located in the hollow chamber. In some embodiments, the system comprises a chamber divider located between the anterior chamber and the posterior chamber. In some embodiments, the system comprises a fan located in the fan aperture, wherein the fan is operatively connected to a power source.

DESCRIPTION OF PREFERRED EMBODIMENTS

Figure 1:
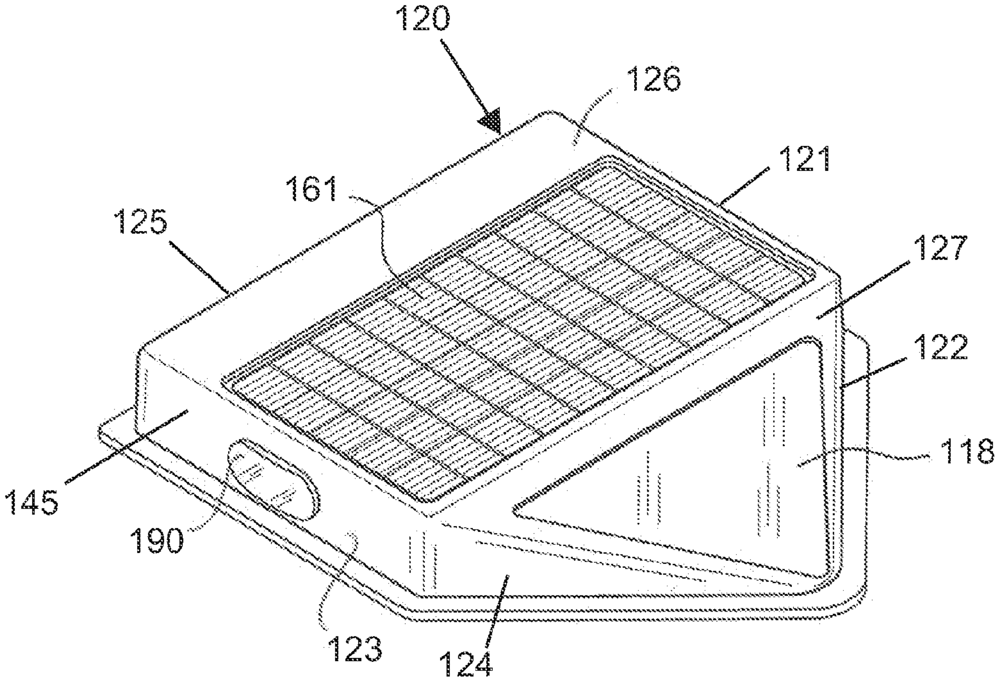
FIG. 1 shows a perspective view of the ventilation housing of the present invention.
Figure 2:
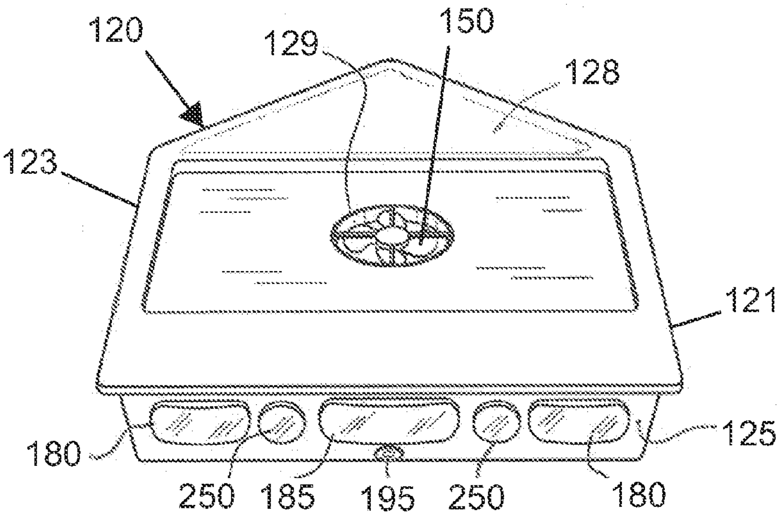
FIG. 2 shows a bottom view of the ventilation housing of the present invention.
Figure 3:
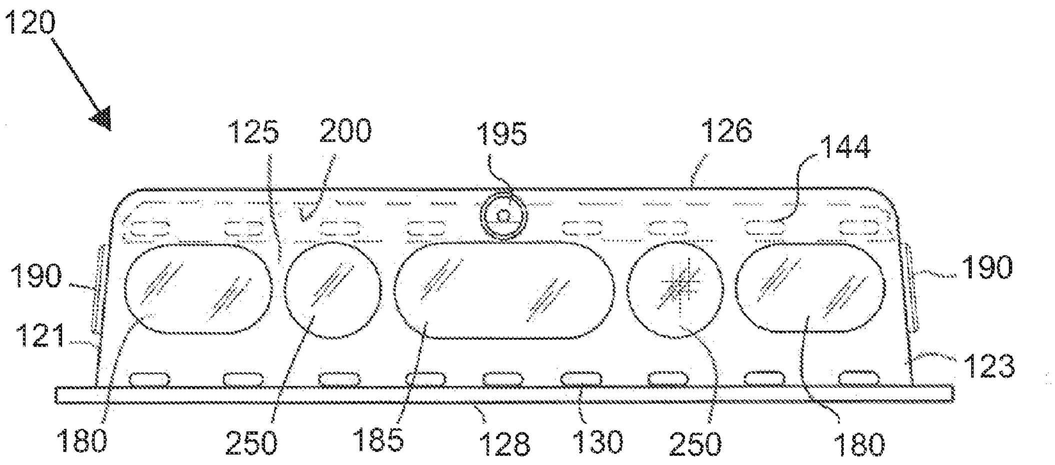
FIG. 3 shows a rear view of the ventilation housing of the present invention.
Figure 4:
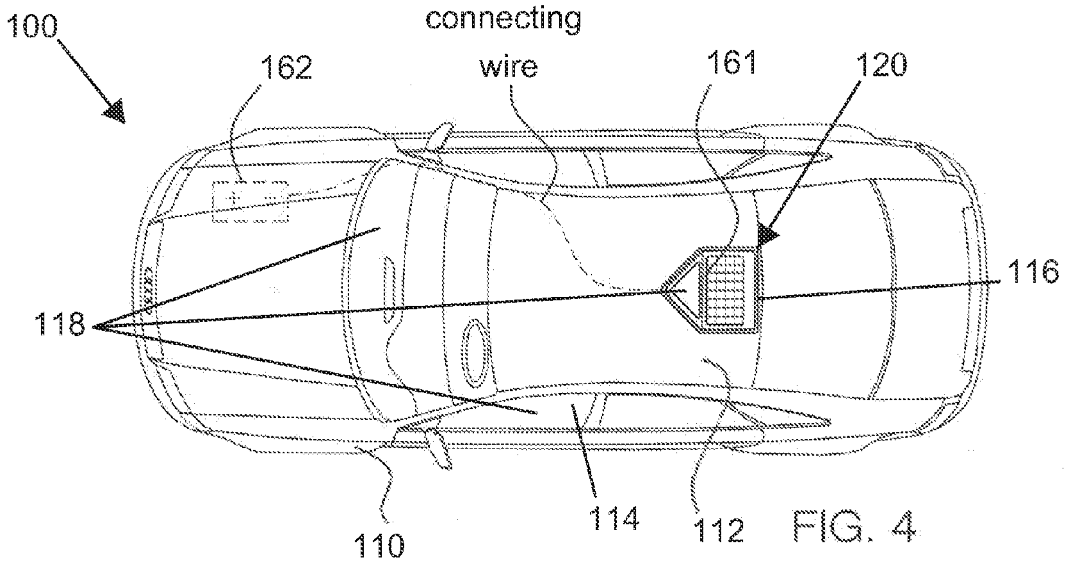
FIG. 4 shows an overhead view of the present invention.
Figure 5:
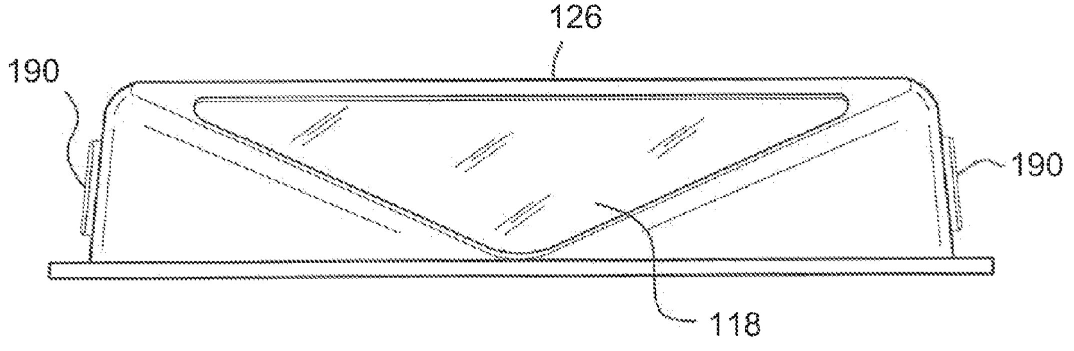
FIG. 5 shows a front view of the ventilation housing of the present invention.
Figure 6:
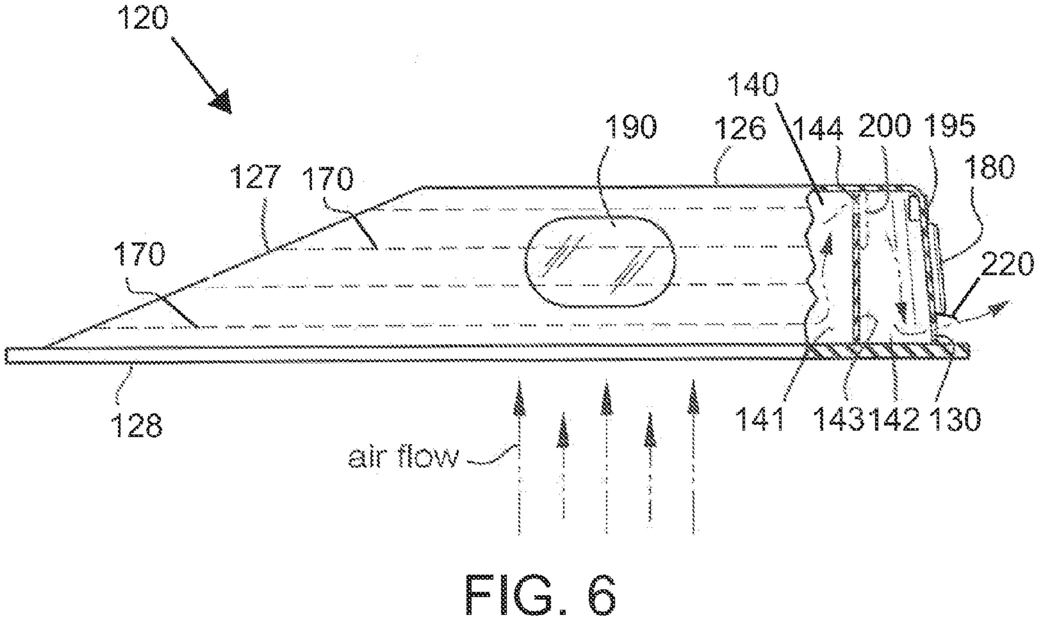
FIG. 6 shows a cutaway view of the side of the ventilation housing of the present invention.
Figure 7:
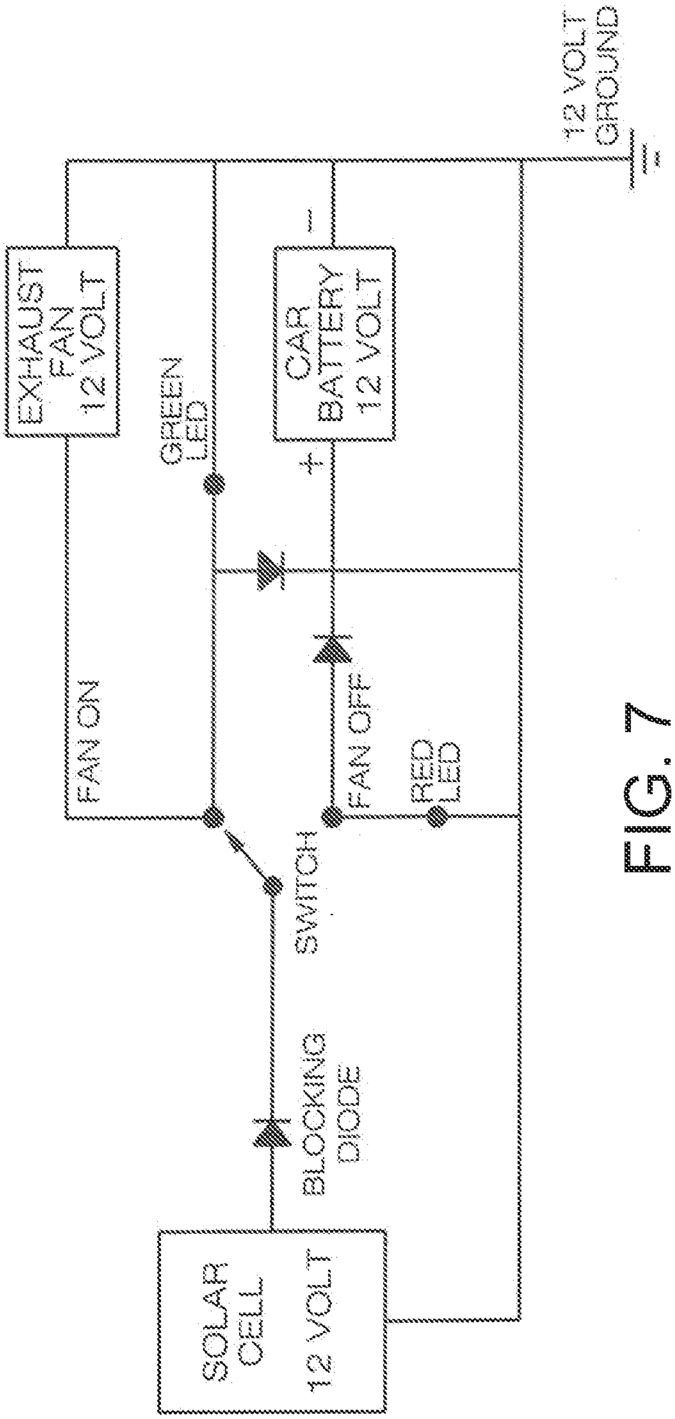
FIG. 7 shows a schematic of the fan operation of the present invention.
Figure 8:
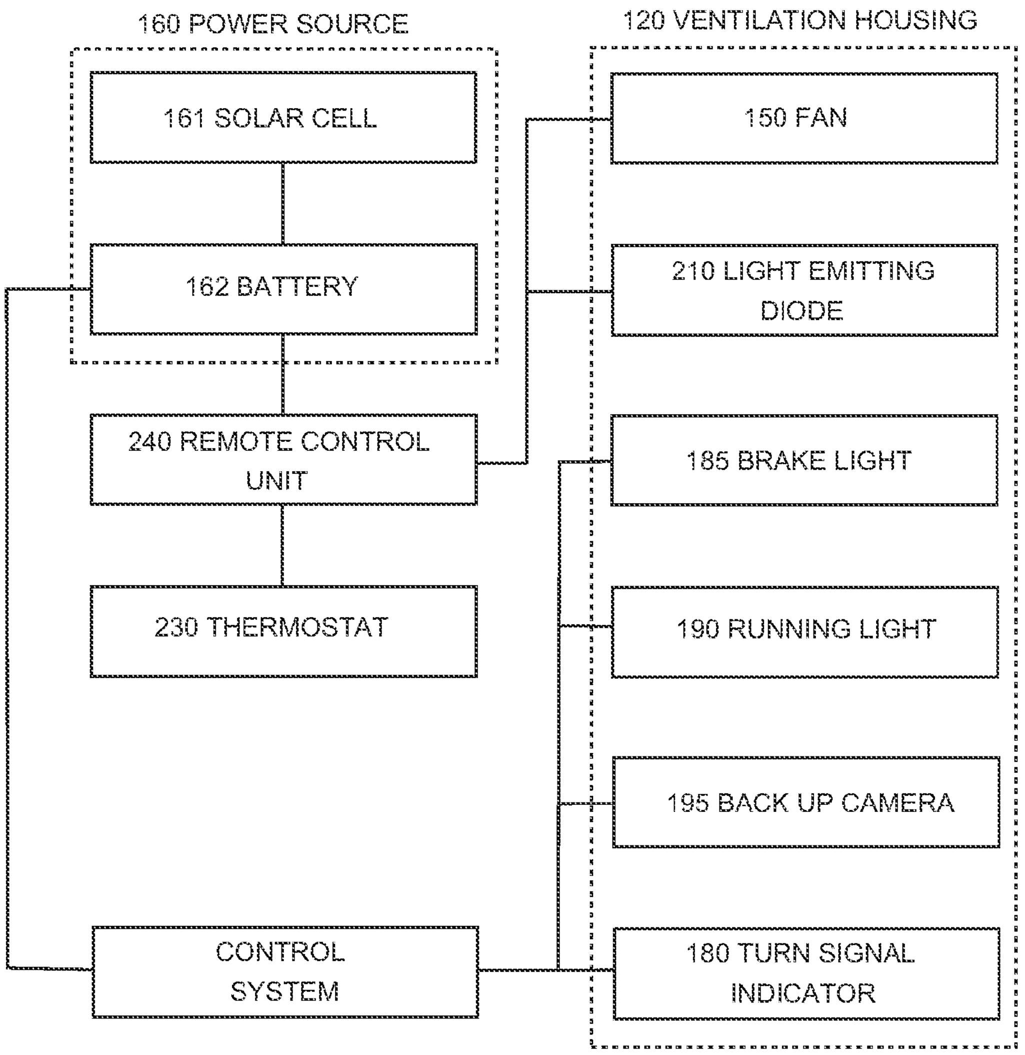
FIG. 8 shows a schematic of the present invention.

Following is a list of elements corresponding to a particular element referred to herein:

100 Ventilation system
110 Automobile
112 Roof
114 Passenger cabin
116 Ventilation housing aperture
118 Window
120 Ventilation housing
121 Housing first side
122 Housing first front side
123 Housing second side
124 Housing second front side
125 Housing rear side
126 Housing top side
127 Housing tapering top side
128 Housing bottom side
129 Fan aperture
130 Exterior vent aperture
140 Housing chamber
141 Anterior chamber
142 Posterior chamber
143 Chamber divider
144 Chamber divider aperture
145 Housing side wall
150 Fan
160 Power source
161 Solar cell
162 Battery
170 Antenna
180 Turn signal indicator
185 Brake light
190 Running light
195 Back up camera
200 Filter
210 Light emitting diode
220 Louver
230 Thermostat
240 Remote control unit
250 Back up light Referring now to FIG. 1-8, the present invention features a ventilation system (100) for regulating the passenger cabin temperature of an automobile. In some embodiments, the system (100) comprises an automobile (110) having a roof (112) and a passenger cabin (114). In some embodiments, the passenger cabin (114) is located inside the automobile (110) beneath the roof (112). In some embodiments, the roof (112) comprises a ventilation housing aperture (116) located therein.

In some embodiments, the system (100) comprises a ventilation housing (120) having a housing first side (121), a housing second side (123), a housing first front side (122), a housing second front side (124), a housing rear side (125), a housing top side (126), a triangular housing tapering top side (127), a housing bottom side (128), and a housing side wall (145). In some embodiments, the ventilation housing (120) comprises a hollow housing chamber (140) located therein. In some embodiments, the housing bottom side (128) comprises a fan aperture (129) located therein. In some embodiments, the housing bottom side (128) is sealably located on the ventilation housing aperture (116) thereon. In some embodiments, the housing rear side (125) comprises an exterior vent aperture (130) located therein. In some embodiments, the exterior vent aperture (130) is located close to the housing bottom side (128). In some embodiments, the housing further comprises forward facing searchlights. For example, the searchlight is much like the spotlights near the driver's side outside mirror in traditional cars, or mounted above the cab of trucks for off road use. This would improve visibility at night. These searchlights or spotlights may be mounted near the housing second front side (124) on each side.

In some embodiments, the system (100) comprises an anterior chamber (141) located in the housing chamber (140) In some embodiments, the anterior chamber (141) is located close to the housing first front side (122), and the housing second side (123).

In some embodiments, the system (100) comprises a posterior chamber (142) located in the housing chamber (140). In some embodiments, the posterior chamber (142) is located posterior to the anterior chamber (141). In some embodiments, the posterior chamber (142) is located close to the housing rear side (125).

In some embodiments, the system (100) comprises a chamber divider (143) located between the anterior chamber (141) and the posterior chamber (142). In some embodiments, the chamber divider (143) is perpendicularly located with respect to the housing top side (126) and the housing bottom side (128). In some embodiments, the chamber divider (143) comprises a chamber divider aperture (144) located therein. In some embodiments, the anterior chamber (141) is fluidly connected to the posterior chamber (142) via the chamber divider aperture (144). In some embodiments, the chamber divider aperture (144) is located close to the housing top side (126).

In some embodiments, the system (100) comprises a fan (150) located in the fan aperture (129). In some embodiments, the fan (150) is operatively connected to a power source (160), In some embodiments, the fan (150) draws hot air from inside the passenger cabin (114) into the anterior chamber (141). In some embodiments, the fan (150) forces the hot air through the chamber divider aperture (144) into the posterior chamber (142). In some embodiments, the fan (150) forces the hot air through the exterior vent aperture (130) outside the automobile (110).

In some embodiments, the power source (160) is a solar cell (161) located in the housing top side (126).

In some embodiments, the power source (160) is an automobile battery (162).

In some embodiments, the power source (160) is an automobile battery (162) operatively connected to a solar cell (161). In some embodiments, the solar cell (161) is located in the housing top side (126).

In some embodiments, a window (118) is located in the housing tapering top side (127).

In some embodiments, one or more antennae (170) are sandwiched in the housing side wall (145). In some embodiments, the antennae (170) are operatively connected to a device receiving radio frequency transmissions.

In some embodiments, a first turn signal indicator (180) is located in the housing rear side (125) close to the housing first side (121). In some embodiments, a second turn signal indicator (180) is located in the housing rear side (125) close the housing second side (123). In some embodiments, the first turn signal indicator (180) and the second turn signal indicator (180) are operatively connected to an automobile turn signal system.

In some embodiments, a brake light (185) is located in the housing rear side (125). In some embodiments, the brake light (185) is operatively connected to an automobile braking system. In some embodiments, a back up light (250) is located in the housing rear side (125) and operatively connected to the automobile reverse system.

In some embodiments, a first running light (190) is located on the housing first side (121). In some embodiments, a second running light (190) is located on the housing second side (123). In some embodiments, the first running light (190) and the second running light (190) are operatively connected to an automotive lighting system.

In some embodiments, a back up camera (195) is located on the housing rear side (125). In some embodiments, the back up camera (195) is operatively connected to an automobile back up camera system.

In some embodiments, a filter (200) is sealably located on the chamber divider (143), wherein the filter (200) fully covers the chamber divider aperture (144).

In some embodiments, a first light emitting diode (210) is operatively connected to the fan (150) to indicate operation. In some embodiments, a second light emitting diode (210) is operatively connected to the power source (160) to indicate inoperation.

In some embodiments, the exterior vent aperture (130) comprises an angled louver (220) located thereon. In some embodiments, the angled louver (220) is positioned to deflect precipitation from overhead.

In some embodiments, the housing bottom side (128) comprises an interior light emitting diode (210) located thereon for illuminating the passenger cabin (114). In some embodiments, the light emitting diode (210) is operatively connected to the power source (160).

In some embodiments, the automobile (110) comprises one or more windows (118), wherein metallic window tint is located on the window (118).

In some embodiments, a thermostat (230) is located in the passenger cabin (114). In some embodiments, the thermostat (230) is operatively connected to the power source (160).

In some embodiments, the system (100) comprises a remote control unit (240) operatively connected to the power source (160). In some embodiments, the remote control unit (240) is for controlling operation of the fan (150).

In some embodiments, the system (100) comprises a smooth, aerodynamic ventilation housing (120). In some embodiments, the ventilation housing (120) is constructed from plastic or fiberglass. In some embodiments, the ventilation housing (120) is constructed from metal.

In some embodiments, the ventilation housing (120) is about 21 inches long from an intersection of the housing first front side (122) and the housing second front side (124) to the housing rear side (125). In some embodiments, the ventilation housing (120) is between 12 and 21 inches long. In some embodiments, the ventilation housing (120) is between 1 and 12 inches long, in some embodiments, the ventilation housing (120) is between 21 and 32 inches long. In some embodiments, the ventilation housing (120) is between 32 and 48 inches long.

In some embodiments, the ventilation housing (120) is about 13½ inches wide from the housing first side (121) to the housing second side (123). In some embodiments, the ventilation housing (120) is between 1 and 13½ inches wide. In some embodiments, the ventilation housing (120) is between 13½ and 24 inches wide. In some embodiments, the ventilation housing (120) is greater than 24 inches wide.

In some embodiments, the ventilation housing (120) is about 3 inches high from the housing top side (126) to the housing bottom side (128). In some embodiments, the ventilation housing (120) is about 1 inch high from the housing top side (126) to the housing bottom side (128). In some embodiments, the ventilation housing (120) is about 2 inches high from the housing top side (126) to the housing bottom side (128). In some embodiments, the ventilation housing (120) is about 4 inches high from the housing top side (126) to the housing bottom side (128). In some embodiments, the ventilation housing (120) is about 5 inches high from the housing top side (126) to the housing bottom side (128). In some embodiments, the ventilation housing (120) is greater than 6 inches high from the housing top side (126) to the housing bottom side (128).

In some embodiments, the housing rear side (125) comprises six louvers (220) positioned at 10-degree angles. In some embodiments, the housing rear side (125) comprises six louvers (220) positioned at 20-degree angles. In some embodiments, the housing rear side (125) comprises six louvers (220) positioned at 30-degree angles. In some embodiments, the housing rear side (125) comprises six louvers (220) positioned at 40-degree angles. In some embodiments, there are more than six louvers (220). In some embodiments, there are between one and six louvers (220).

In some embodiments, the ventilation housing aperture (116) is located close to a rear of the roof (112) of the automobile (110).

In some embodiments, the dual chambers (anterior chamber (141) and posterior chamber (142)) prevent external air, moisture, debris and noise from entering the automobile (110). In some embodiments, a water barrier is located in the posterior chamber (142).

In some embodiments, the fan (150) is 12-volt.

In some embodiments, the solar cell (161) is 10-watt. In some embodiments the solar cell (161) is a solar panel. In some embodiments, the solar cell (161) connects to the battery (162) via a blocking diode to provide a trickle charge to the battery (162). In some embodiments, if the battery (162) is dead, the solar cell (161) slowly charges the battery (162) so the automobile (110) can start. In some embodiments, if the automobile (110) is parked in sunlight, the trickle charge keeps the battery (162) charged.

In some embodiments, the system (100) is designed to lower the passenger cabin (114) temperature up to 40 degrees. In some embodiments, complete air exchange in a small automobile (110) (70 cubic feet) would take 2 minutes. In some embodiments, complete air exchange in a larger automobile (110), like a full size SUV (155 cubic feet) would take 5 minutes.

In some embodiments, the present invention features a built-in (invisible) mobile phone/satellite radio/television/internet satellite/radio antenna (170) embedded in the ventilation housing (120) for superior reception of radio frequency signals. In some embodiments, more than one antenna (170) is referred to as antennae (170) and can be used interchangeably. In some embodiments, the present invention features 360 degree reception without blocking a driver's view through the windows (118). In some embodiments, the antenna (170) is located in the resin of the ventilation housing (120). In some embodiments, the antennae (170) operate in 4 or more frequency bands. In some embodiments, the system (100) features a signal amplifier. In some embodiments, the system (100) features a wireless router. In some embodiments, the signal amplifier and the wireless router are 12 volt.

In some embodiments, the antennae (170) operatively connect to devices (radio or television) or output jacks. In some embodiments, the antennae (170) reradiate the radio signals within the passenger cabin (114).

In some embodiments, a combiner can combine signals in the same satellite internet frequency range. In some embodiments, a different antenna (170) is required for each frequency range as follows:

AM radio Frequency Range is: 540 to 1600 KHz
FM radio Frequency Range is: 88 to 108 MHz
DIGITAL TV Frequency Range is: 470 to 750 MHz
CELL phone Frequency Range is: 800 to 1900 MHz
Satellite radio Frequency Range is: 2320 to 2345 MHz
Satellite TV Frequency Range is: 18300 to 20200 MHz
Satellite Internet Frequency Range is: 18300 to 20200 MHz (downlink) 27500 to 31000 MHz (uplink)

The rooftop antenna can be tuned for multiple frequency bands to acquire all cell phone and Satellite radio, TV and Internet reception.

In some embodiments, metallic reflector glass reduces solar gain in the automobile (110), thereby reducing air conditioning usage and emissions while improving gas mileage, however metallic coating blocks radio signals. In some embodiments, the antennae (170) of the present invention overcome the drawbacks of metallic reflector glass. One of the benefits of the metallic tinted windows is the reduction of high incidence of skin cancer for automobile passengers. Currently, passengers are exposed for long periods of time to solar rays through untinted window glass. Incidence of skin cancer has been rising. With a rooftop antenna, metallic window tinting can be used on all windows to block solar rays and protect the occupants.

In some embodiments, the light emitting diode (210) (LED) is 12 volt. In some embodiments, a row of LEDs are located around a perimeter of the housing bottom side (128). In some embodiments, an ON/OFF switch is mounted on the housing bottom side (128). In some embodiments, interior lights (map lights) are located on the housing bottom side (128) to be used as reading lights for the backseat occupants.

As used herein, the term "about" refers to plus or minus 10% of the referenced number.

The disclosures of the following U.S. Patents are incorporated in their entirety by reference herein: U.S. Pat. No. 5,078,047; U.S. Pat. No. 5,918,972; U.S. Pat. No. 6,290,593; U.S. Pat. No. 6,328,369; U.S. Pat. No. 6,840,660; U.S. Patent Pub. No. 2005/0003751; U.S. Patent Pub. No. 2007/0121288; and U.S. Patent Pub. No. 2007/0125417.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures.

The reference numbers recited in the below claims are solely for ease of examination of this patent application, and are exemplary, and are not intended in any way to limit the scope of the claims to the particular features having the corresponding reference numbers in the drawings.

What is claimed is:

1. A ventilation system (100) for regulating the passenger cabin temperature of an automobile, wherein the system (100) comprises:

(a) an automobile (110) having a roof (112) and a passenger cabin (114), wherein the passenger cabin (114) is disposed inside the automobile (110) beneath the roof (112), wherein the roof (112) comprises a ventilation housing aperture (116) disposed therein;

(b) a ventilation housing (120) having a housing first side (121), a housing second side (123), a housing first front side (122), a housing second front side (124), a housing rear side (125), a housing top side (126), a triangular housing tapering top side (127), a housing bottom side (128), and a housing side wall (145), wherein the ventilation housing (120) comprises a hollow housing chamber (140) disposed therein, wherein the housing bottom side (128) comprises a fan aperture (129) disposed therein, wherein the housing bottom side (128) is sealably disposed on the ventilation housing aperture (116) thereon, wherein the housing rear side (125) comprises an exterior vent aperture (130) disposed therein, wherein the exterior vent aperture (130) is disposed proximal to the housing bottom side (128);

wherein the exterior vent aperture (130) comprises a plurality of angled louvers (220) disposed thereon positioned to deflect precipitation from overhead, wherein the louvers (220) are positioned at one of 10-degree angles, 20-degree angles, 30-degree angles, and 40-degree angles from a plane defined by the exterior vent aperture;

(c) an anterior chamber (141) disposed in the housing chamber (140), wherein the anterior chamber (141) is disposed proximal to the housing first front side (122), and the housing second side (123);

(d) a posterior chamber (142) disposed in the housing chamber (140), wherein the posterior chamber (142) is disposed posterior to the anterior chamber (141), wherein the posterior chamber (142) is disposed proximal to the housing rear side (125);

(e) a chamber divider (143) disposed between the anterior chamber (141) and the posterior chamber (142), wherein the chamber divider (143) is perpendicularly disposed with respect to the housing top side (126) and the housing bottom side (128), wherein the chamber divider (143) comprises a chamber divider aperture (144) disposed therein, wherein the anterior chamber (141) is fluidly connected to the posterior chamber (142) via the chamber divider aperture (144), wherein the chamber divider aperture (144) is disposed proximal to the housing top side (126); and (f) a fan (150) disposed in the fan aperture (129), wherein the fan (150) is operatively connected to a power source (160); wherein the power source (160) is a solar cell (161) disposed in the housing top side (126), wherein the solar cell (161) is 10-watt and the fan (150) is 12-volt;

wherein the fan (150) draws hot air from inside the passenger cabin (114) into the anterior chamber (141), wherein the fan (150) forces the hot air through the chamber divider aperture (144) into the posterior chamber (142), wherein the fan (150) forces the hot air through the exterior vent aperture (130) outside the automobile (110);

wherein the exterior vent apertures (130) are a series of independent apertures located at the bottom side (128) of the ventilation housing (120) and disposed underneath a first turn signal indicator (180) and a second turn signal indicator (180) stretching an entire length of the housing rear side (125), wherein the first turn signal indicator (180) and the second turn signal indicator (180) lays over a middle region of the housing rear side (125);

wherein the chamber divider aperture (144) separates distinctly the anterior chamber (141) and the posterior chamber (142), wherein the anterior chamber (141) receives upward movement of collection of hot air and pass it to the posterior chamber (142) wherein the hot air vents out through a downward movement through the exterior vent apertures (130) disposed at the bottom side (128) of the ventilation housing (120);

wherein the ventilation housing (120) is either about 21 inches, between 12 and 21 inches, between 1 and 12 inches, between 21 and 32 inches, or between 32 and 48 inches long from an intersection of the housing first front side (122) and the housing second front side (124) to the housing rear side (125);

wherein the ventilation housing (120) is either about 13½ inches, between 1 and 13½ inches, between 13½ and 24 inches, or greater than 24 inches wide from the housing first side (121) to the housing second side (123);

wherein the ventilation housing (120) is either about 3 inches, about 1 inch, about 2 inches, about 4 inches, about 5 inches, or greater than 6 inches high from the housing top side (126) to the housing bottom side (128);

the ventilation housing (120) further comprises an antenna (170) which is sandwiched in the housing side wall (145), wherein the antenna (170) is operatively connected to a device receiving radio frequency transmissions, further comprising a combiner that can combine signals in the same satellite internet frequency range, wherein the antennae (170) operate in 4 or more frequency bands, wherein either a different antenna (170) is required for each frequency range as follows:

AM radio Frequency Range is: 540 to 1600 KHz
FM radio Frequency Range is: 88 to 108 MHz
Digital TV Frequency Range is: 470 to 750 MHz
Cell phone Frequency Range is: 800 to 1900 MHz
Satellite radio Frequency Range is: 2320 to 2345 MHz
Satellite TV Frequency Range is: 18300 to 20200 MHz
Satellite Internet Frequency Range is: 18300 to 20200 MHz (downlink) and 27500 to 31000 MHz (uplink);

or wherein a single antenna can be tuned for multiple frequency bands to acquire all cell phone and satellite radio, TV and Internet reception, the ventilation housing (120) further comprises a first light emitting diode (210) which is operatively connected to the fan (150) to indicate operation, and a second light emitting diode (210) is operatively connected to the power source (160) to indicate inoperation, wherein the light emitting diode (210) is 12 volt.

2. The system (100) of claim 1, wherein the power source (160) is an automobile battery (162).

3. The system (100) of claim 1, wherein the power source (160) is an automobile battery (162) operatively connected to a solar cell (161), wherein the solar cell (161) is disposed in the housing top side (126).

4. The system (100) of claim 1, wherein a window (118) is disposed in the housing tapering top side (127).

5. The system (100) of claim 1, wherein a first turn signal indicator (180) is disposed in the housing rear side (125) proximal to the housing first side (121), wherein a second turn signal indicator (180) is disposed in the housing rear side (125) proximal the housing second side (123), wherein the first turn signal indicator (180) and the second turn signal indicator (180) are operatively connected to an automobile turn signal system.

6. The system (100) of claim 1, wherein a brake light (185) is disposed in the housing rear side (125), wherein the brake light (185) is operatively connected to an automobile braking system.

7. The system (100) of claim 1, wherein a first running light (190) is disposed on the housing first side (121), wherein a second running light (190) is disposed on the housing second side (123), wherein the first running light (190) and the second running light (190) are operatively connected to an automotive lighting system.

8. The system (100) of claim 1, wherein a backup camera (195) is disposed on the housing rear side (125), wherein the backup camera (195) is operatively connected to an automobile back up camera system.

9. The system (100) of claim 1, wherein a filter (200) is sealably disposed on the chamber divider (143), wherein the filter (200) fully covers the chamber divider aperture (144).

10. The system (100) of claim 1, wherein the housing bottom side (128) comprises an interior light emitting diode (210) disposed thereon for illuminating the passenger cabin (114), wherein the light emitting diode (210) is operatively connected to the power source (160).

11. The system (100) of claim 1, wherein the automobile (110) comprises one or more windows (118), wherein metallic window tint is disposed on the window (118).

12. The system (100) of claim 1, wherein a thermostat (230) is disposed in the passenger cabin (114), wherein the thermostat (230) is operatively connected to the power source (160).

13. The system (100) of claim 1, wherein the system (100) comprises a remote control unit (240) operatively connected to the power source (160), wherein the remote control unit (240) is for controlling operation of the fan (150).

14. A ventilation system (100) for regulating the passenger cabin temperature of an automobile, wherein the system (100) consisting of:

(a) an automobile (110) having a roof (112) and a passenger cabin (114), wherein the passenger cabin (114) is disposed inside the automobile (110) beneath the roof (112), wherein the roof (112) comprises a ventilation housing aperture (116) disposed therein;

(b) a ventilation housing (120) having a housing first side (121), a housing second side (123), a housing first front side (122), a housing second front side (124), a housing rear side (125), a housing top side (126), a triangular housing tapering top side (127), a housing bottom side (128), and a housing side wall (145), wherein the ventilation housing (120) consisting of a hollow housing chamber (140) disposed therein, wherein the housing bottom side (128) consisting of a fan aperture (129) disposed therein, wherein the housing bottom side (128) is sealably disposed on the ventilation housing aperture (116) thereon, wherein the housing rear side (125) consisting of an exterior vent aperture (130) disposed therein, wherein the exterior vent aperture (130) is disposed proximal to the housing bottom side (128); wherein the exterior vent aperture (130) comprises a plurality of angled louvers (220) disposed thereon positioned to deflect precipitation from overhead, wherein the louvers (220) are positioned at one of 10-degree angles, 30-degree angles, and 40-degree angles from a plane defined by the exterior vent aperture;

(c) an anterior chamber (141) disposed in the housing chamber (140), wherein the anterior chamber (141) is disposed proximal to the housing first front side (122), and the housing second side (123);

(d) a posterior chamber (142) disposed in the housing chamber (140), wherein the posterior chamber (142) is disposed posterior to the anterior chamber (141), wherein the posterior chamber (142) is disposed proximal to the housing rear side (125);

(e) a chamber divider (143) disposed between the anterior chamber (141) and the posterior chamber (142), wherein the chamber divider (143) is perpendicularly disposed with respect to the housing top side (126) and the housing bottom side (128), wherein the chamber divider (143) consisting of a chamber divider aperture (144) disposed therein, wherein the anterior chamber (141) is fluidly connected to the posterior chamber (142) via the chamber divider aperture (144), wherein the chamber divider aperture (144) is disposed proximal to the housing top side (126); and (f) a fan (150) disposed in the fan aperture (129), wherein the fan (150) is operatively connected to a power source (160); wherein the power source (160) is a solar cell (161) disposed in the housing top side (126), wherein the solar cell (161) is 10-watt and the fan (150) is 12-volt;

wherein the fan (150) draws hot air from inside the passenger cabin (114) into the anterior chamber (141), wherein the fan (150) forces the hot air through the chamber divider aperture (144) into the posterior chamber (142), wherein the fan (150) forces the hot air through the exterior vent aperture (130) outside the automobile (110);

wherein the exterior vent apertures (130) are series of independent apertures located at the bottom side (128) of the ventilation housing (120) and disposed underneath a first turn signal indicator (180) and a second turn signal indicator (180) stretching an entire length of the housing rear side (125), wherein the first turn signal indicator (180) and the second turn signal indicator (180) lays over a middle region of the housing rear side (125);

wherein the chamber divider aperture (144) separates distinctly the anterior chamber (141) and the posterior chamber (142), wherein the anterior chamber (141) receives upward movement of collection of hot air and pass it to the posterior chamber (142) wherein the hot air vents out through a downward movement through the exterior vent apertures (130) disposed at the bottom side (128) of the ventilation housing (120);

wherein the ventilation housing (120) is either about 21 inches, between 12 and 21 inches, between 1 and 12 inches, between 21 and 32 inches, or between 32 and 48 inches long from an intersection of the housing first front side (122) and the housing second front side (124) to the housing rear side (125);

wherein the ventilation housing (120) is either about 13½ inches, between 1 and 13½ inches, between 13½ and 24 inches, or greater than 24 inches wide from the housing first side (121) to the housing second side (123);

wherein the ventilation housing (120) is either about 3 inches, about 1 inch, about 2 inches, about 4 inches, about 5 inches, or greater than 6 inches high from the housing top side (126) to the housing bottom side (128);

the ventilation housing (120) further consisting of an antenna (170) which is sandwiched in the housing side wall (145), wherein the antenna (170) is operatively connected to a device receiving radio frequency transmissions, further comprising a combiner can combine signals in the same satellite internet frequency range, wherein the antennae (170) operate in 4 or more frequency bands, wherein either a different antenna (170) is required for each frequency range as follows:

AM radio Frequency Range is: 540 to 1600 KHz

FM radio Frequency Range is: 88 to 108 MHz

Digital TV Frequency Range is: 470 to 750 MHz

Cell phone Frequency Range is: 800 to 1900 MHz

Satellite radio Frequency Range is: 2320 to 2345 MHz

Satellite TV Frequency Range is: 18300 to 20200 MHz

Satellite Internet Frequency Range is: 18300 to 20200 MHz (downlink) and 27500 to 31000 MHz (uplink);

or wherein a single antenna is tuned for multiple frequency bands to acquire all cell phone and satellite radio, TV and Internet reception, the ventilation housing (120) further consisting of a first light emitting diode (210) which is operatively connected to the fan (150) to indicate operation, and a second light emitting diode (210) is operatively connected to the power source (160) to indicate inoperation, wherein the light emitting diode (210) is 12 volt.

* * * * *